(12) United States Patent
Kaneko et al.

(10) Patent No.: US 11,868,487 B2
(45) Date of Patent: *Jan. 9, 2024

(54) SIGNAL PROCESSING DEVICE AND SIGNAL PROCESSING METHOD

(71) Applicant: SONY SEMICONDUCTOR SOLUTIONS CORPORATION, Kanagawa (JP)

(72) Inventors: Tatsuya Kaneko, Kanagawa (JP); Motohashi Yuichi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,628

(22) Filed: Apr. 12, 2022

(65) Prior Publication Data

US 2022/0237305 A1     Jul. 28, 2022

Related U.S. Application Data

(63) Continuation of application No. 16/620,086, filed as application No. PCT/JP2018/021143 on Jun. 1, 2018, now Pat. No. 11,361,085.

(30) Foreign Application Priority Data

Jun. 16, 2017   (JP) ................................. 2017-118494

(51) Int. Cl.
*G06F 21/60* (2013.01)
*H04L 9/40* (2022.01)
*G06V 20/56* (2022.01)

(52) U.S. Cl.
CPC ............ *G06F 21/602* (2013.01); *G06V 20/56* (2022.01); *H04L 63/0428* (2013.01); *H04L 63/083* (2013.01)

(58) Field of Classification Search
None
See application file for complete search history.

(56) References Cited

U.S. PATENT DOCUMENTS 9,432,197 B2 *   8/2016   Naganuma .......... H04L 63/0838
2007/0162568 A1   7/2007   Gupta
(Continued)

FOREIGN PATENT DOCUMENTS

| AU | 2007203542 A1 | 2/2008 |
|----|---------------|--------|
| CA | 2742126 A | 5/2009 |

(Continued)

OTHER PUBLICATIONS

Office Action for JP Patent Application No. 2019-525311, dated Mar. 29, 2022, 08 pages of English Translation and 07 pages of Office Action.

(Continued)

*Primary Examiner* — Brandon Hoffman
(74) *Attorney, Agent, or Firm* — CHIP LAW GROUP

(57) ABSTRACT

The present technology relates to a signal processing device and a signal processing method for enabling reduction of a processing load while ensuring safety. The signal processing device includes a control unit that acquires designation information indicating a designated portion to be encrypted in output data and an encryption processing unit that encrypts the designated portion indicated by the designation information in the output data using a key. Furthermore, the designated portion indicated by the designation information is changed with time. The present technology can be applied to an in-vehicle camera.

20 Claims, 11 Drawing Sheets

(56) References Cited

U.S. PATENT DOCUMENTS

| | | |
|---|---|---|
| 2007/0177718 A1 | 8/2007 | Shimosato et al. |
| 2008/0028204 A1 | 1/2008 | Masuhiro et al. |
| 2009/0245509 A1 | 10/2009 | Shimosato et al. |
| 2010/0090822 A1* | 4/2010 | Benson .................. G06Q 50/28 340/508 |
| 2010/0225738 A1 | 9/2010 | Webster |
| 2010/0316222 A1 | 12/2010 | Inami |
| 2012/0237180 A1 | 9/2012 | Yoshioka |

FOREIGN PATENT DOCUMENTS

| | | |
|---|---|---|
| CN | 1623324 A | 6/2005 |
| CN | 1623327 A | 6/2005 |
| CN | 1875568 A | 12/2006 |
| CN | 101010905 A | 8/2007 |
| CN | 101159737 A | 4/2008 |
| CN | 101256613 A | 9/2008 |
| CN | 105745862 A | 7/2016 |
| EP | 1667356 A1 | 6/2006 |
| EP | 3148198 A1 | 3/2017 |
| HK | 1117295 A1 | 1/2009 |
| JP | 2008-035234 A | 2/2008 |
| JP | 4650267 B2 | 3/2011 |
| JP | 2012159979 A | 8/2012 |
| JP | 2017-041841 A | 2/2017 |
| KR | 10-1139580 B1 | 4/2012 |
| WO | 2005/029765 A1 | 3/2005 |
| WO | 2009/058914 A1 | 5/2009 |
| WO | WO-2016076449 A1 | 5/2016 |
| WO | WO-2016122003 A1 | 8/2016 |

OTHER PUBLICATIONS

Takenomori, et al., "Protection for Automotive Control System Using Secure Boot and Authentication", Information Processing Society of Japan, The Institute of Electronic Information Communication Engineers, vol. 114, No. 225, Sep. 12, 2014, pp. 47-54.

Takemori, et al., "Protection for Automotive Control System Using Secure Boot and Authentication", Technical Report, Information of society of Japan (IPSJ), vol. 114, No. 225, Sep. 12, 2014, pp. 47-54.

International Search Report and Written Opinion of PCT Application No. PCT/JP2018/021143, dated Aug. 14, 2018, 09 pages of English Translation and 08 pages of ISRWO.

Notice of Allowance for U.S. Appl. No. 16/620,086, dated Jan. 14, 2022, 11 pages.

Non-Final Office Action for U.S. Appl. No. 16/620,086, dated Aug. 10, 2021, 9 pages.

International Preliminary Report on Patentability of PCT Application No. PCT/JP2018/021143, dated Dec. 26, 2019, 09 pages of English Translation and 05 pages of IPRP.

* cited by examiner

SIGNAL PROCESSING DEVICE AND SIGNAL PROCESSING METHOD

CROSS REFERENCE TO RELATED APPLICATIONS

This application is a continuation application of U.S. patent application Ser. No. 16/620,086, filed on Dec. 6, 2019, now U.S. Pat. No. 11,361,085, is a U.S. National Phase of International Patent Application No. PCT/JP2018/021143 filed on Jun. 1, 2018, which claims priority benefit of Japanese Patent Application No. JP 2017-118494 filed in the Japan Patent Office on Jun. 16, 2017. Each of the above-referenced applications is hereby incorporated herein by reference in its entirety.

TECHNICAL FIELD

The present technology relates to a signal processing device, a signal processing method, and a program, and more particularly to a signal processing device, a signal processing method, and a program for enabling reduction of a processing load while ensuring safety.

BACKGROUND ART

In recent years, the number of automobiles equipped with a safety function using an in-vehicle camera has been increasing and movements to implement automatic driving in a few years are active.

In automatic driving of an automobile, since an output image obtained by the camera is analyzed, and a steering wheel, an accelerator, a brake, and the like are controlled on the basis of the analysis result, correctness of the output image of the camera is required.

Therefore, the in-vehicle camera is required to have not only functional safety for checking whether the camera itself is correctly operating but also the safety of the output image, that is, a security function for preventing malicious behaviors such as replacement of the camera and falsification of the output image.

In particular, the in-vehicle camera needs to ensure safety for each frame of the output image. This is because if the output image is falsified, for example, a malicious accident may occur.

For example, in the field of surveillance cameras, a technology of generating a signature for verifying the presence/absence of falsification using part or all of video data obtained by capture, and outputting video data with a signature has been proposed as a technology regarding the security function of images (see Patent Document 1, for example).

CITATION LIST

Patent Document

Patent Document 1: Japanese Patent Application Laid-Open No. 2017-41841

SUMMARY OF THE INVENTION

Problems to be Solved by the Invention

However, it has been difficult to ensure the safety of an image output with a low cost, that is, with a small processing amount with the above-described technology.

For example, it is possible to ensure the safety of the output image by encrypting the output image itself, various signals for control, and the like, by using an existing technology. Similarly, the technology described in Patent Document 1 can ensure the safety of the video data by generating the signature using the entire video data.

However, in this case, since a region to be encrypted or signed is large, a high-load processing is required in the camera and a subsequent block of the camera in order to ensure the safety of the output image, that is, the security.

In particular, when considering an in-vehicle camera, analysis processing for an output image of the camera and control regarding driving such as acceleration and braking based on the analysis result are performed in the subsequent block of the camera, and thus the processing load in the subsequent block of the camera is inherently high.

Since such high-load processing causes an increase in power consumption, the in-vehicle camera produced with a small casing is disadvantageous in terms of size and power consumption.

Furthermore, in the technology described in Patent Document 1, it is possible to reduce the processing load by generating a signature using a predetermined region of the video data, but it becomes difficult to ensure sufficient safety by doing so. In particular, in this case, if the region to be signed of the video data leaks, falsification cannot be detected even if a portion not to be signed of the video data is falsified because the region to be signed is always the same region.

The present technology has been made in view of such a situation, and enables reduction of a processing load while ensuring the safety.

Solutions to Problems

A signal processing device according to the first aspect of the present technology includes a control unit configured to acquire designation information indicating a designated portion to be encrypted in output data, and an encryption processing unit configured to encrypt the designated portion indicated by the designation information in the output data using a key, in which the designated portion indicated by the designation information changes with time.

A signal processing method or a program according to the first aspect of the present technology includes steps of acquiring designation information indicating a designated portion to be encrypted in output data, and encrypting the designated portion indicated by the designation information in the output data using a key, in which the designated portion indicated by the designation information changes with time.

In the first aspect of the present technology, designation information indicating a designated portion to be encrypted in output data is acquired, and the designated portion indicated by the designation information in the output data is encrypted using a key. Furthermore, the designated portion indicated by the designation information is changed with time.

A signal processing device according to the second aspect of the present technology includes a control unit configured to generate designation information indicating a designated portion to be encrypted in acquired data while changing the designated portion with time, a communication unit configured to transmit the designation information, and an acquisition unit configured to acquire encrypted data obtained by encrypting the designated portion indicated by the designation information in the acquired data and the acquired data.

A signal processing method or a program according to the second aspect of the present technology includes steps of generating designation information indicating a designated portion to be encrypted in acquired data while changing the designated portion with time, transmitting the designation information, and acquiring encrypted data obtained by encrypting the designated portion indicated by the designation information in the acquired data and the acquired data.

In the second aspect of the present technology, designation information indicating a designated portion to be encrypted in acquired data is generated while changing the designated portion with time, the designation information is transmitted, and encrypted data obtained by encrypting the designated portion indicated by the designation information in the acquired data and the acquired data are acquired.

Effects of the Invention

According to the first and second aspects of the present technology, it is possible to reduce the processing load while ensuring safety.

Note that the effects described here are not necessarily limited, and any of effects described in the present disclosure may be exhibited.

MODE FOR CARRYING OUT THE INVENTION

Figure 1:
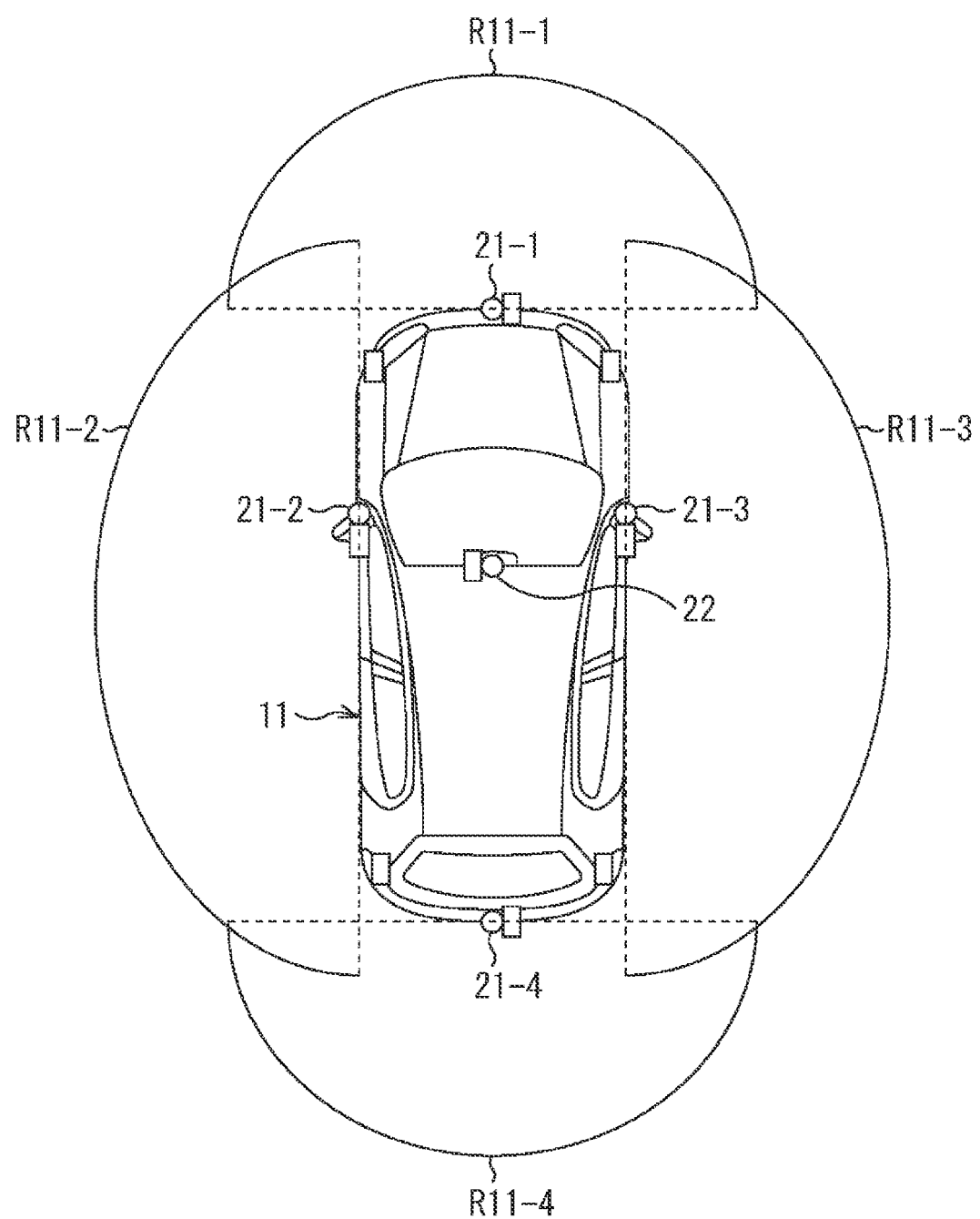
FIG. 1 is a diagram for describing a configuration example of a vehicle.

Hereinafter, embodiments to which the present technology is applied will be described with reference to the drawings.

First Embodiment

<Configuration Example of Image Processing System>

The present technology enables reduction of a processing load while ensuring safety by encrypting a partial region of a captured image of an in-vehicle camera and outputting the encrypted data to a subsequent stage of the camera, and changing a region to be encrypted with time.

That is, the present technology can reduce the processing load in the camera and the subsequent stage of the camera by encrypting only a partial region of the captured image.

Furthermore, the safety (security) can be ensured by changing the region to be encrypted with time, that is, by setting an arbitrary region as the region to be encrypted in each frame of the captured image.

For example, in a case of randomly changing the region to be encrypted for each frame of the captured image, a malicious third part cannot specify the region to be encrypted and thus cannot falsify the captured image. Therefore, sufficient safety can be ensured with a small processing amount, that is, a low processing load.

At this time, even if the region to be encrypted in a certain frame is specified by the malicious third party, the region to be encrypted has already been changed in the next frame. Therefore, the sufficient safety can be ensured unlike the case where the same region is always set as the region to be encrypted.

Such a present technology can be applied to a camera mounted on a moving body such as a motorcycle, a bicycle, an electric wheelchair, a personal mobility, an airplane, a ship, a train, or a robot, a system using such a camera, and the like, in addition to the in-vehicle camera and an in-vehicle system using the in-vehicle camera.

Furthermore, in the present technology, data to be ensured for safety, that is, data to be detected for falsification is not limited to image data, and the data can be arbitrary data such as sound data and various measurement data.

Even in such a case, it is only required to encrypt a designated portion to be encrypted of target data to be ensured for safety while changing the designated portion of the target data with time, and output encrypted data obtained by the encryption and the target data. Specifically, in a case where the target data is sound data, for example, it is only required to designate a predetermined sound section (range) in the sound data as the designated portion to be encrypted, and change the sound section with time. Here, the number of the designated portions of the target data may be one or plural.

Note that, hereinafter, a case in which the present technology is applied to an image processing system including in-vehicle cameras will be described as a specific example. In this case, image data of a captured image obtained by capture corresponds to the above-described target data to be ensured for safety, a partial region to be encrypted of the captured image corresponds to the above-described designated portion, and an encrypted image obtained by encrypting the partial region of the captured image corresponds to the above-described encrypted data.

Hereinafter, more specific embodiments will be described.

FIG. 1 is a diagram illustrating a configuration example of an embodiment of a vehicle including an image processing system to which the present technology is applied.

A vehicle 11 illustrated in FIG. 1 is an automobile, and a plurality of in-vehicle cameras is mounted on the vehicle 11 to support front sensing, around view sensing, and the like. That is, for example, the vehicle 11 is provided with in-vehicle cameras 21-1 to 21-4 for obtaining captured images to be used for control regarding driving of the vehicle 11.

Here, the camera 21-1 is a camera for obtaining a captured image of a region R11-1 in front of the vehicle 11 as an object.

Furthermore, the camera 21-2 is a camera for obtaining a captured image of a region R11-2 on the left side of the vehicle 11 as an object, and the camera 21-3 is a camera for obtaining a captured image of a region R11-3 on the right side of the vehicle 11 as an object.

Moreover, the camera 21-4 is a camera for obtaining a captured image of a region R11-4 on the rear of the vehicle 11 as an object.

Note that, hereinafter, the cameras 21-1 to 21-4 are also simply referred to as camera(s) 21 unless the cameras 21-1 to 21-4 particularly need to be distinguished from one another.

The captured images obtained by these cameras 21 are supplied to a vehicle control unit 22 disposed in the center of the vehicle 11, for example, and are used for control regarding driving of the vehicle 11.

The vehicle control unit 22 includes, for example, an advanced driving assistant system (ADAS) chip and the like, and performs an image analysis for the captured image supplied from the camera 21 and performs control regarding driving of the vehicle 11 such as a steering wheel, an accelerator, and a brake, on the basis of a result of the image analysis.

Figure 2:
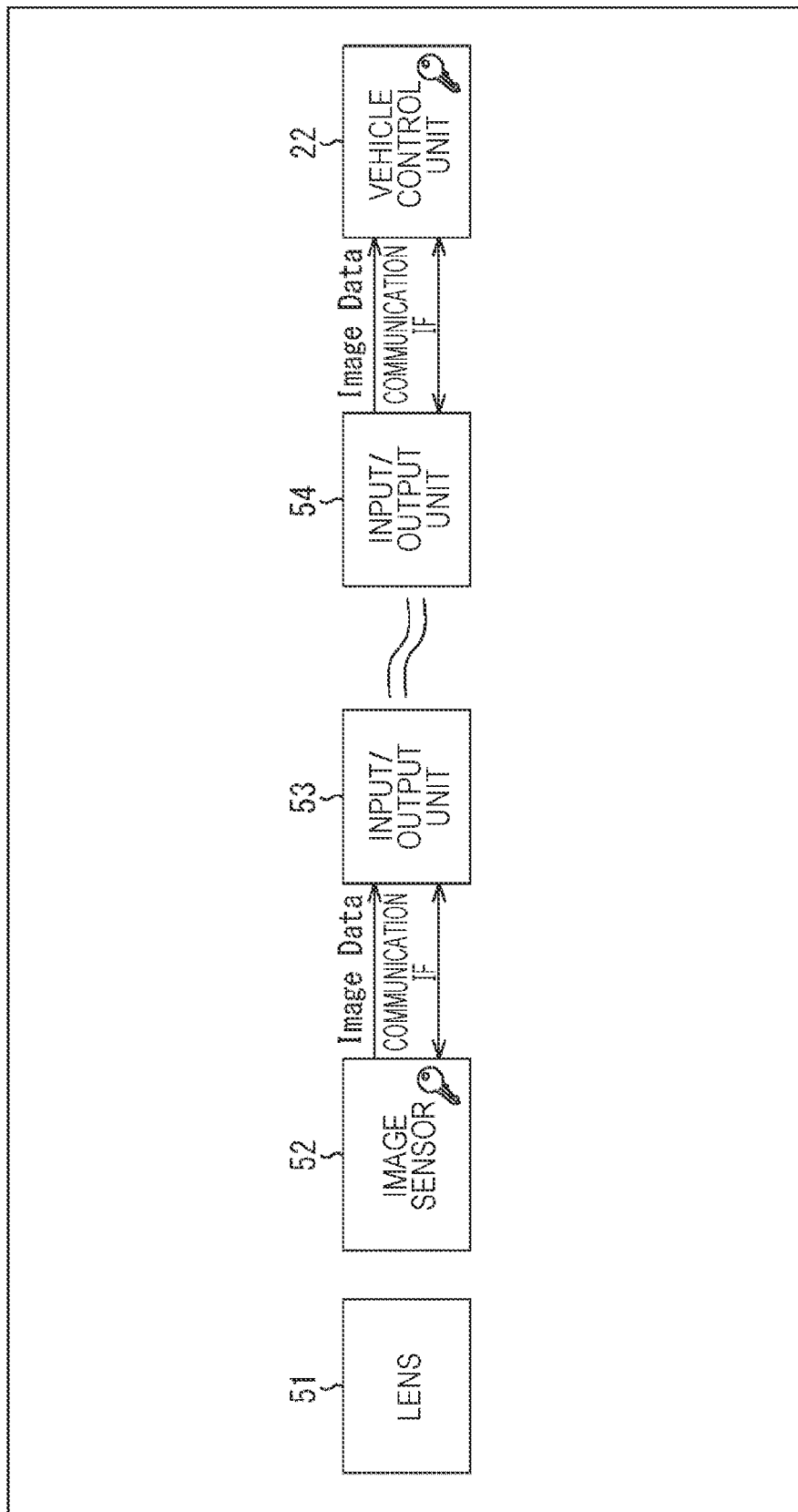
FIG. 2 is a diagram for describing a configuration example of an image processing system.

In the vehicle 11, a system including the camera 21 and the vehicle control unit 22 is the image processing system, and in more detail, the image processing system is configured as illustrated in FIG. 2. Note that, in FIG. 2, a portion corresponding to the case in FIG. 1 is denoted by the same reference numeral, and description thereof is omitted as appropriate.

The image processing system illustrated in FIG. 2 includes a lens 51, an image sensor 52, an input/output unit 53, an input/output unit 54, and a vehicle control unit 22.

Here, an imaging device including, for example, the lens 51 and the image sensor 52 corresponds to one camera 21 illustrated in FIG. 1. Therefore, in more detail, the image processing system is provided with the four cameras 21 each including the lens 51 and the image sensor 52. FIG. 2 illustrates only the lens 51 and the image sensor 52 corresponding to one camera 21 for the sake of simplicity.

The lens 51 includes one or a plurality of optical lenses, collects light incident from an object and guides the light to an imaging surface of the image sensor 52.

The image sensor 52 includes, for example, a complementary metal oxide semiconductor (CMOS) image sensor, and the like, and operates according to control information supplied from the vehicle control unit 22 via the input/output unit 53 and the input/output unit 54. For example, the image sensor 52 receives the light incident through the lens 51 and photoelectrically converts the light to capture a captured image, and supplies image data of the obtained captured image to the input/output unit 53. Note that the captured image may be a still image or a moving image. Here, the captured image is assumed to be a moving image.

The input/output unit 53 and the input/output unit 54 are communication interface (I/F) for long-distance communication in the vehicle 11, such as a serializer or a deserializer, for example, and implement communication between the image sensor 52 and the vehicle control unit 22.

For example, the input/output unit 53 converts the image data of the captured image supplied from the image sensor 52 and various types of information from parallel data into serial data, and supplies the serial data to the input/output unit 54. The input/output unit 54 converts the image data and the various types of information supplied from the input/output unit 53 from the serial data into parallel data, and supplies the parallel data to the vehicle control unit 22.

Similarly, for example, the input/output unit 54 converts various types of information supplied from the vehicle control unit 22 from parallel data into serial data, and supplies the serial data to the input/output unit 53. The input/output unit 53 converts the various types of information supplied from the input/output unit 54 from the serial data into parallel data, and supplies the parallel data to the image sensor 52.

In the image processing system illustrated in FIG. 2, the image sensor 52 captures the captured image according to the control by the vehicle control unit 22 and supplies the captured image obtained by the capture to the vehicle control unit 22. Then, the vehicle control unit 22 performs control regarding driving of the vehicle 11 on the basis of the captured image obtained by the image sensor 52.

As described above, the image processing system performs the control regarding driving of the vehicle 11, and thus needs to prevent accidents and the like caused by falsification or fraud by a malicious third party. That is, safety (security) needs to be ensured.

Figure 3:
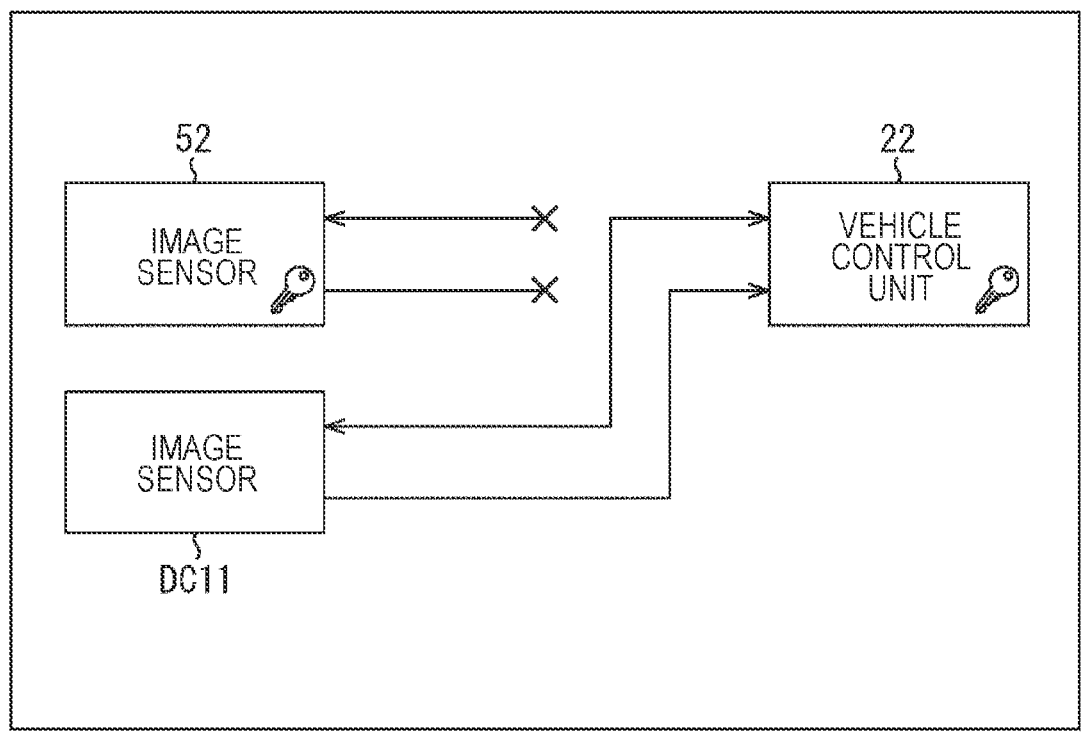
FIG. 3 is a diagram for describing replacement of an image sensor.

Specifically, as illustrated in FIG. 3, for example, it is necessary to prevent the camera 21 including the image sensor 52 originally supposed to be connected to the vehicle control unit 22 from being removed and replaced with a camera including another unauthorized image sensor DC11.

That is, it is necessary to confirm that the image sensor 52 and the vehicle control unit 22 are connected in a correct combination to prevent replacement with the unauthorized image sensor DC11.

This is because, for example, if the legitimate image sensor 52 is replaced with an unauthorized image sensor and the like such as an inexpensive copy product, the safety of the captured image supplied to the vehicle control unit 22 cannot be ensured.

For example, if the legitimate image sensor 52 is replaced with the unauthorized image sensor DC11, the image sensor DC11 does not operate as instructed by the vehicle control unit 22 even if the vehicle control unit 22 supplies the control information and tries to perform setting of capture and the like, and the safety of the captured image cannot be ensured. If so, the control regarding driving cannot be correctly performed, and there is a possibility of occurrence of an accident.

Therefore, in the image processing system, the image sensor 52 and the vehicle control unit 22 store a common secret key, that is, the same secret key, in advance, and the vehicle control unit 22 authenticates the image sensor 52 using the secret key. In other words, authentication processing using the common secret key is performed between the image sensor 52 that is an output source (acquisition source) of the captured image and the vehicle control unit 22 that is an output destination of the captured image.

Although details will be described below, whether the correct image sensor 52 is connected to the vehicle control unit 22 is authenticated by exchanging authentication messages encrypted with the secret key between the vehicle control unit 22 and the image sensor 52 at the time of authentication. In the case where the unauthorized image sensor DC11 is connected to the vehicle control unit 22, authentication is not correctly performed. Therefore, disconnection of the correct image sensor 52 can be detected (sensed) by the authentication processing.

By such authentication processing, connection of the image sensor 52 and the vehicle control unit 22 in a correct combination is confirmed and the replacement with the unauthorized image sensor DC11 can be prevented. As a result, the safety of the image sensor 52 can be ensured.

In particular, the image processing system authenticates the image sensor 52 at the time of activation of the camera 21. By the authentication, an occurrence of an accident due to replacement of the camera 21 or the like can be prevented from the start of driving (the start) of the vehicle 11.

Furthermore, to ensure the safety (security), the image processing system determines whether the captured image itself supplied to the vehicle control unit 22 is not falsified and is correct, thereby constructing a secure (safe) channel between the image sensor 52 and the vehicle control unit 22.

Figure 4:
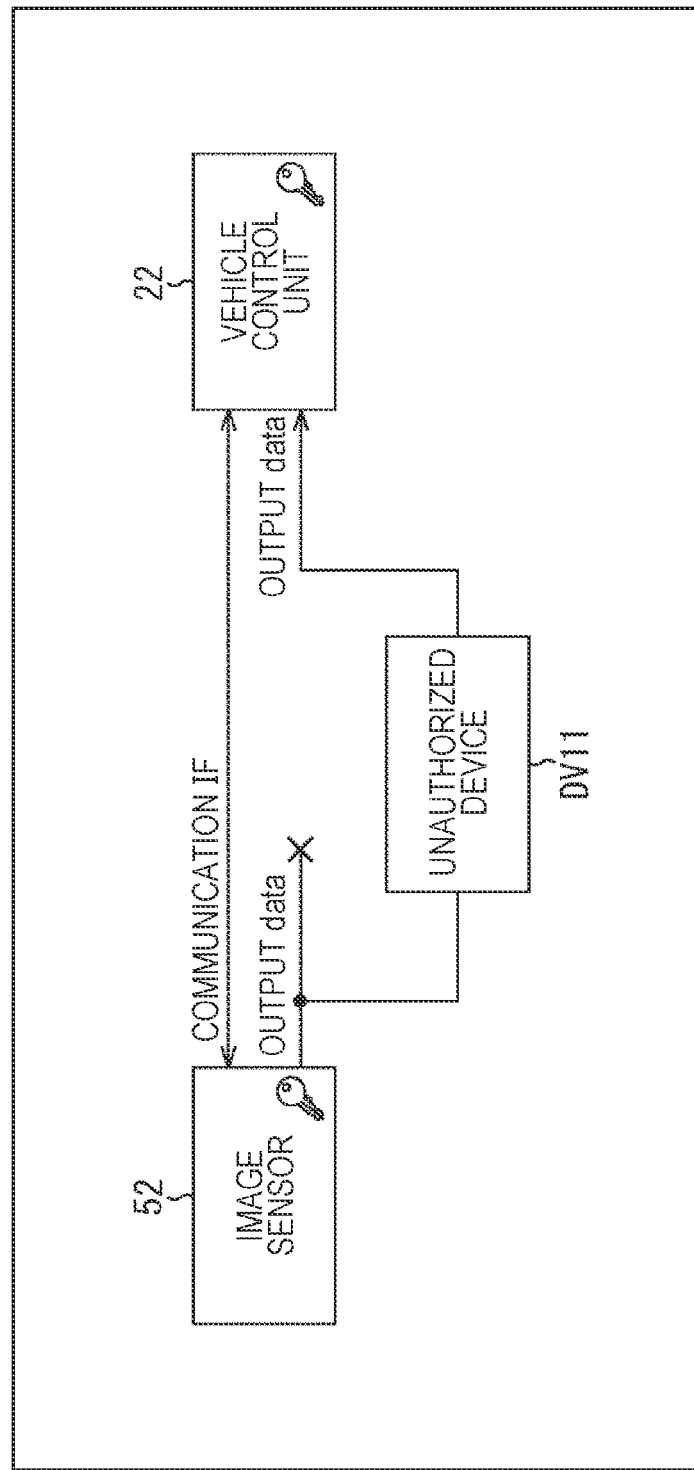
FIG. 4 is a diagram for describing falsification of a captured image.

For example, a case in which an illegitimate unauthorized device DV11 may be inserted between the image sensor 52 and the vehicle control unit 22, as illustrated in FIG. 4.

In the example illustrated in FIG. 4, an unauthorized device is not inserted between the vehicle control unit 22 and the image sensor 52 in a communication path where delivery of control information such as settings of capture is performed, and the vehicle control unit 22 can control the image sensor 52 as intended.

However, the unauthorized device DV11 is inserted between the image sensor 52 and the vehicle control unit 22 in a communication path in which the captured image is supplied, that is, a channel (hereinafter also referred to as an image channel). Therefore, the unauthorized device DV11 can falsify the captured image output from the image sensor 52 and supply the captured image to the vehicle control unit 22.

When the unauthorized device DV11 is inserted in this manner, there is a possibility that the captured image is intentionally falsified by a malicious third party so that an accident occurs.

Therefore, the image processing system ensures data of each frame of the captured image using the above-described secret key stored in the image sensor 52 and the vehicle control unit 22. That is, falsification of the captured image is sensed to ensure the safety.

Specifically, the image sensor 52 encrypts an image of a portion of an encryption region that is a region on the captured image designated by the vehicle control unit 22, using the stored secret key, for each frame of the captured image, and outputs a resultant encrypted image to the vehicle control unit 22.

The vehicle control unit 22 compares an encrypted image obtained by encrypting the image of a portion of the encryption region of the captured image supplied from the image sensor 52 using the stored secret key with the encrypted image supplied from the image sensor 52, thereby sensing whether the captured image has been falsified. By such processing, the safety of the captured image can be ensured for each frame.

The image processing system needs to perform the processing of sensing falsification of the captured image for each frame but the image processing system encrypts only the partial region of the captured image, that is, only the encryption region, and thus can reduce the processing load in the image sensor 52 and the vehicle control unit 22.

Furthermore, if the encryption region that is a processing target to be sensed for falsification is narrow (small), the safety of the captured image decreases. The image processing system changes the encryption region with time such as for each frame, thereby ensuring sufficient safety of the captured image.

The encryption region is designated by the vehicle control unit 22. The vehicle control unit 22 can randomly change the position and size of a region to serve as the encryption region on the captured image, and the number of encryption regions, for each frame, for example.

By randomly changing the encryption region for each frame, it is difficult for a third party who tries to falsify the captured image to specify the encryption region at each frame. Furthermore, even if the encryption region in a certain frame is specified by the malicious third party, it is difficult to falsify the captured image so as not to be sensed by the vehicle control unit 22 because the position and size of the encryption region have been changed in the next frame.

Thus, the image processing system changes the encryption region with time, thereby reducing the processing load in the image sensor 52 and the vehicle control unit 22 while ensuring the safety of the captured image. That is, according to the image processing system, a robust image channel, that is, a secure image channel can be constructed at a low cost, and sufficient safety can be ensured.

Moreover, the image processing system is only required to store the secret key and encrypt a partial region of the captured image. Therefore, a large additional cost is not required such as providing a new block or adding processing with a large load to the image sensor 52 side or the vehicle control unit 22 side. Furthermore, it is only required to ensure the secret key even if the control information exchanged between the image sensor 52 and the vehicle control unit 22 is not encrypted. Therefore, sufficient safety can be ensured at a low cost.

<Configuration Example of Image Sensor>

Next, a more detailed configuration example of the image sensor 52 and the vehicle control unit 22 illustrated in FIG. 2 will be described.

Figure 5:
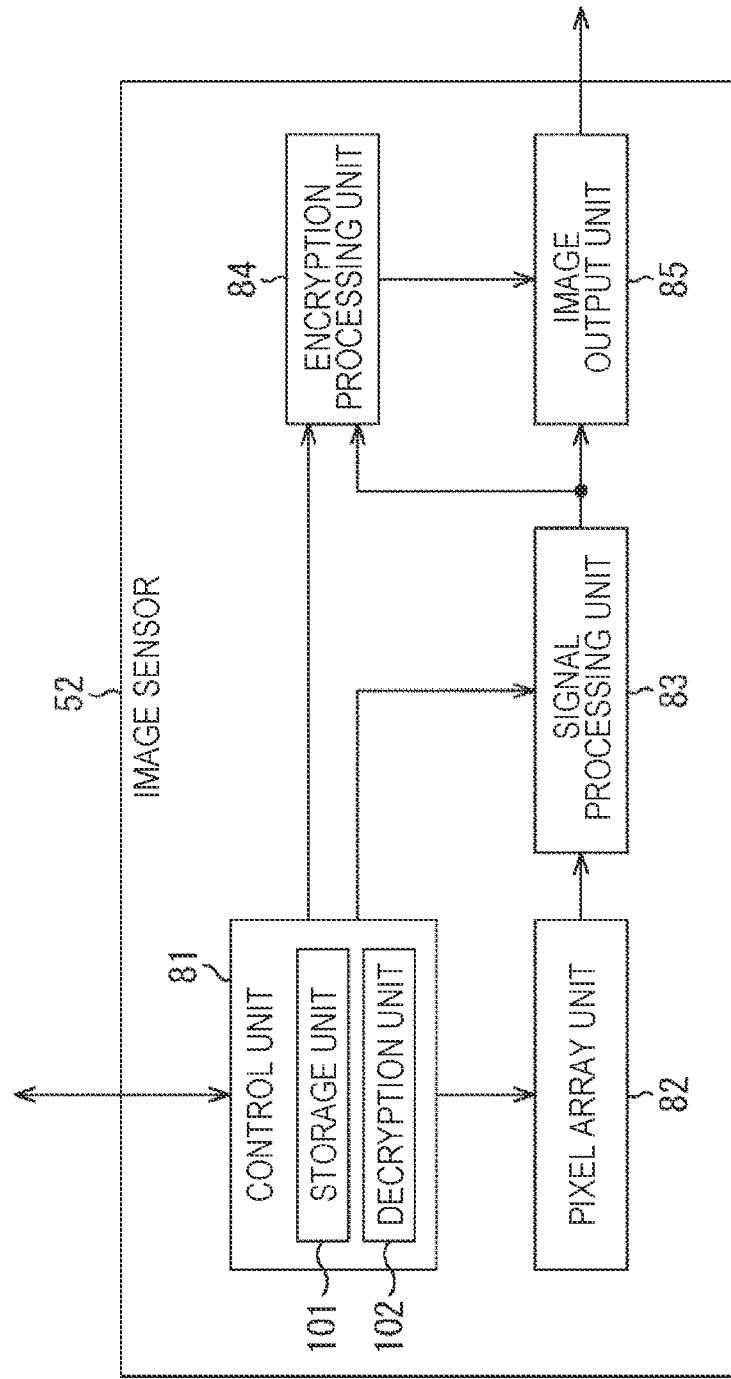
FIG. 5 is a diagram illustrating a configuration example of an image sensor.

FIG. 5 is a diagram illustrating a more detailed configuration example of the image sensor 52.

The image sensor 52 illustrated in FIG. 5 includes a control unit 81, a pixel array unit 82, a signal processing unit 83, an encryption processing unit 84, and an image output unit 85.

The control unit 81 communicates with the vehicle control unit 22 via the input/output unit 53 and the input/output unit 54, and controls the overall operation of the image sensor 52. For example, the control unit 81 communicates with the vehicle control unit 22 and acquires (receives) encryption region designation information indicating the encryption region from the vehicle control unit 22.

Furthermore, the control unit 81 includes a storage unit 101 and a decryption unit 102.

The storage unit 101 stores the secret key supplied in advance. Note that, hereinafter, the secret key stored in the storage unit 101 is also referred to as a secret key KYC.

The decryption unit 102 decrypts predetermined information such as the encrypted encryption region designation information received by the control unit 81 from the vehicle control unit 22, using the secret key KYC stored in the storage unit 101.

The pixel array unit 82 includes a pixel array in which a plurality of pixels is arrayed in a row direction and in a column direction, and each pixel receives light incident from an object according to the control of the control unit 81 and photoelectrically converts the light to generate image data of a captured image. That is, a captured image is captured. The pixel array unit 82 supplies the captured image obtained by capture to the signal processing unit 83.

The signal processing unit 83 applies predetermined processing such as gain adjustment and white balance adjustment to the captured image supplied from the pixel array unit 82 according to the control of the control unit 81, and supplies the captured image to the encryption processing unit 84 and the image output unit 85.

The encryption processing unit 84 encrypts the image of a portion of the encryption region in the captured image supplied from the signal processing unit 83, using the secret key KYC supplied from the control unit 81, according to the control of the control unit 81, and supplies a resultant encrypted image to the image output unit 85.

The image output unit 85 embeds the encrypted image supplied from the encryption processing unit 84 in a last portion of data for one frame of the captured image supplied from the signal processing unit 83, and transmits the captured image in which the encrypted image is embedded to the vehicle control unit 22 via the input/output unit 53 and the input/output unit 54.

<Configuration Example of Vehicle Control Unit>

Figure 6:
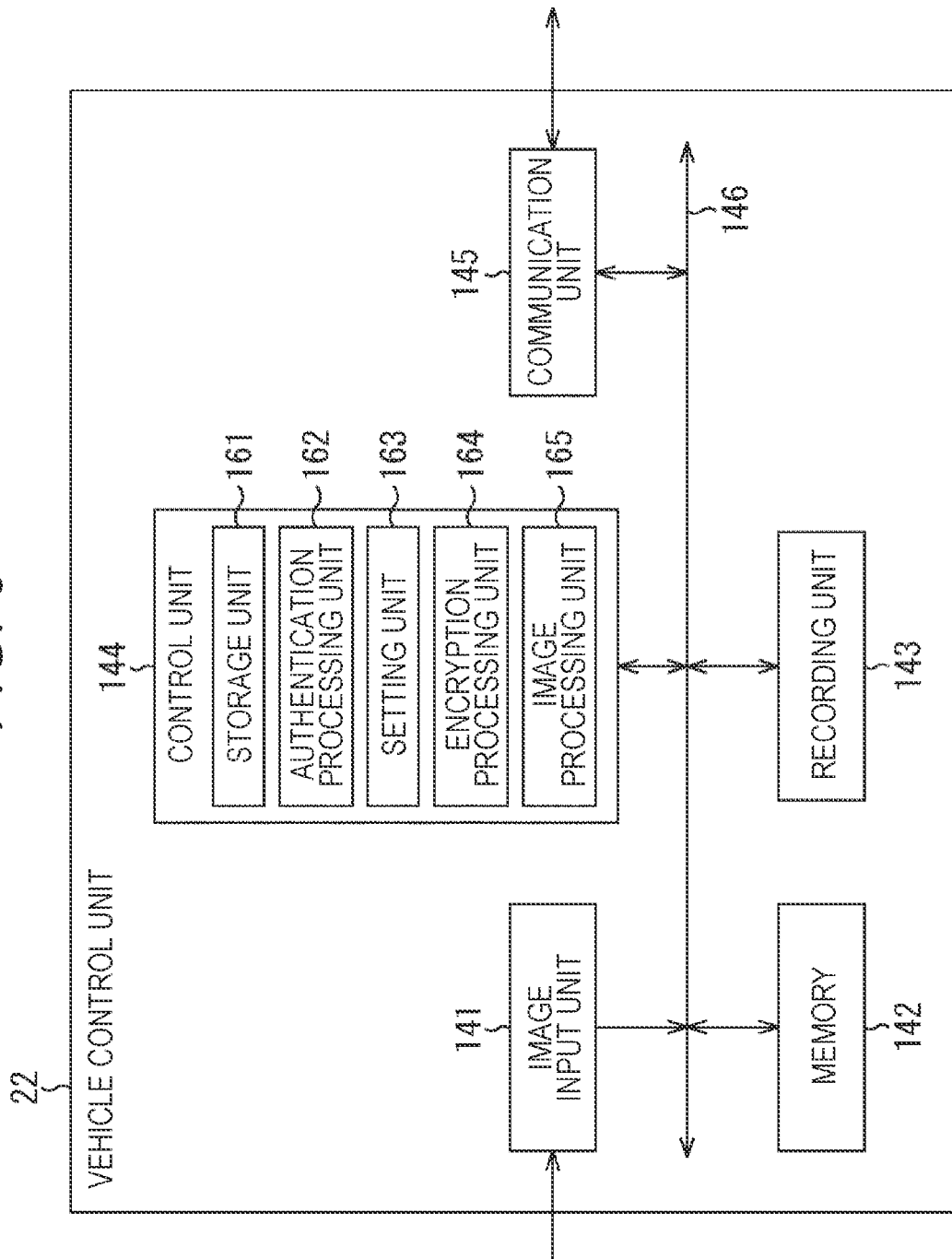
FIG. 6 is a diagram illustrating a configuration example of a vehicle control unit.

Furthermore, the vehicle control unit 22 is configured as illustrated in FIG. 6, for example.

The vehicle control unit 22 illustrated in FIG. 6 includes an image input unit 141, a memory 142, a recording unit 143, a control unit 144, a communication unit 145, and a bus 146. In the vehicle control unit 22, the image input unit 141 through the communication unit 145 are connected to one another via the bus 146.

The image input unit 141 receives the captured image with the embedded encrypted image, which has been transmitted from the image output unit 85 of the image sensor 52, via the input/output unit 54 and the input/output unit 53, and outputs the captured image to the memory 142 and the like. That is, the image input unit 141 functions as an acquisition unit that acquires the encrypted image and the captured image from the image sensor 52.

The memory 142 includes a volatile memory, and temporarily records various types of images and information supplied from the image input unit 141, the control unit 144, and the like. The recording unit 143 includes a nonvolatile recording unit, and records various types of images, information, programs, and the like supplied from the control unit 144 and the like and supplies the recorded images and information to the control unit 144 and the like as necessary.

The control unit 144 controls operation of the entire vehicle control unit 22. The control unit 144 includes a storage unit 161, an authentication processing unit 162, a setting unit 163, an encryption processing unit 164, and an image processing unit 165.

The storage unit 161 stores in advance the same secret key as the secret key KYC stored in the storage unit 101 of the image sensor 52. Note that, hereinafter, the secret key stored in the storage unit 161 is also referred to as a secret key KYA.

The authentication processing unit 162 performs the authentication processing of authenticating the image sensor 52 using the secret key KYA stored in the storage unit 161. The setting unit 163 performs settings regarding the operation of the image sensor 52, such as settings at the time of capturing a captured image.

The encryption processing unit 164 encrypts various types of information and images using the secret key KYA stored in the storage unit 161. For example, the encryption processing unit 164 encrypts the image of a portion of the encryption region in the captured image received by the image input unit 141 to generate an encrypted image.

The image processing unit 165 performs processing regarding control of driving of the vehicle 11 on the basis of the captured image received by the image input unit 141. For example, the image processing unit 165 detects an obstacle or the like from the captured image, generates a control signal for stopping traveling of the vehicle 11 according to the detection result, and outputs the control signal to a brake device or the like.

The communication unit 145 communicates with the control unit 81 of the image sensor 52 via the input/output unit 54 and the input/output unit 53, and exchanges various types of information.

<Description of Response Processing and Connection Sensor Authentication Processing>

Next, a specific operation of the image processing system will be described.

First, processing performed when activation of the camera 21 is given in instruction will be described.

When activation of the camera 21 is given in instruction, the authentication processing unit 162 of the vehicle control unit 22 as the output destination of the captured image and the control unit 81 of the image sensor 52 as the output source (acquisition source) of the captured image start the authentication processing using the common secret key. That is, connection sensor authentication processing is performed by the vehicle control unit 22 and response processing is performed by the image sensor 52, so that the image sensor 52 is authenticated.

Figure 7:
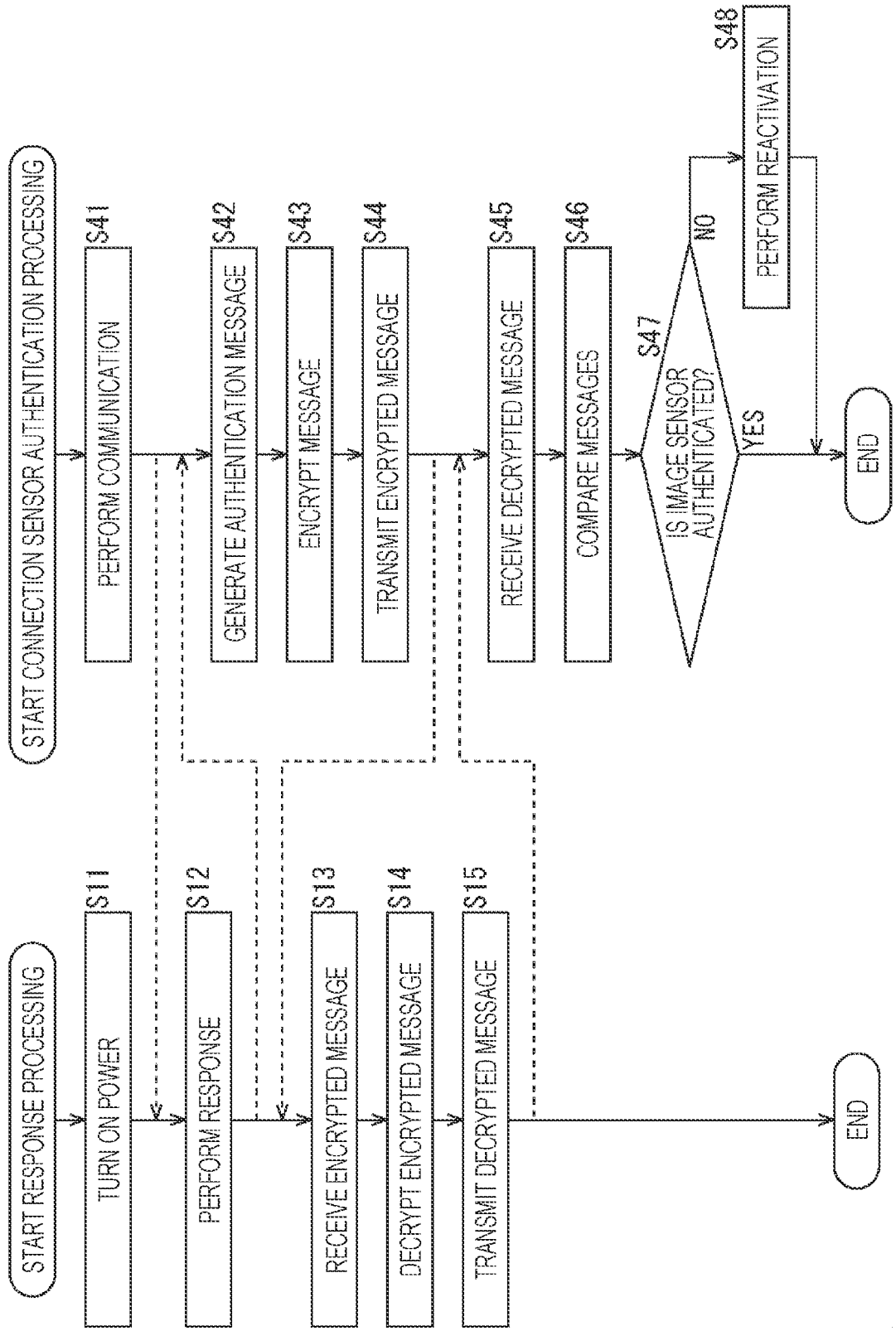
FIG. 7 is a flowchart for describing response processing and connection sensor authentication processing.

Hereinafter, response processing by the image sensor 52 and connection sensor authentication processing by the vehicle control unit 22 will be described with reference to the flowchart in FIG. 7.

In step S11, the image sensor 52 is powered on, and the power is supplied to each unit of the image sensor 52.

Then, in the vehicle control unit 22, in step S41, the control unit 144 controls the communication unit 145 to communicate with the image sensor 52.

That is, for example, the control unit 144 generates a response request for confirming whether the camera 21, that is, the image sensor 52 is connected and supplies the response request to the communication unit 145, and the communication unit 145 transmits the response request supplied from the control unit 144 to the image sensor 52.

The response request transmitted (output) from the communication unit 145 is supplied to the control unit 81 of the image sensor 52 via the input/output unit 54 and the input/output unit 53.

Then, in the image sensor 52, in step S12, the control unit 81 receives the response request transmitted from the communication unit 145 via the input/output unit 53 and the input/output unit 54, and responses according to the response request.

That is, the control unit 81 generates response information indicating that the response request has been received, for example, and transmits the response information to the communication unit 145 of the vehicle control unit 22 via the input/output unit 53 and the input/output unit 54. When the communication unit 145 receives the response information transmitted from the control unit 81, the communication unit 145 supplies the response information to the control unit 144 via the bus 146. Thereby, the control unit 144 can recognize that the vehicle control unit 22 is connected with the image sensor 52 and can correctly communicate with the image sensor 52.

Furthermore, in the vehicle control unit 22, in step S42, the authentication processing unit 162 of the control unit 144 generates an authentication message for the image sensor 52. For example, the authentication message is a random number generated by the authentication processing unit 162 or the like.

In step S43, the encryption processing unit 164 encrypts the authentication message generated in the processing in step S42, using the secret key KYA stored in the storage unit 161, and supplies a resultant encrypted message to the communication unit 145 via the bus 146.

In step S44, the communication unit 145 transmits the encrypted message supplied from the encryption processing unit 164 to the image sensor 52. The encrypted message transmitted by the communication unit 145 is supplied to the control unit 81 of the image sensor 52 via the input/output unit 54 and the input/output unit 53.

Then, in the image sensor 52, in step S13, the control unit 81 receives the encrypted message transmitted by the communication unit 145.

Then, in step S14, the decryption unit 102 decrypts the encrypted message received in step S13, using the secret key KYC stored in the storage unit 101.

In step S15, the control unit 81 transmits a decrypted message obtained by decrypting the encrypted message in step S14 to the communication unit 145 of the vehicle control unit 22 via the input/output unit 53 and the input/output unit 54, and the response processing ends.

If the secret key KYC and the secret key KYA are the same, the decrypted message obtained by decrypting the encrypted message should be the same as the authentication message generated in step S42. The vehicle control unit 22 can confirm that the image sensor 52 is a legitimate image sensor storing the predetermined secret key KYC by comparing the authentication message and the decrypted message. That is, authentication as to whether the image sensor 52 is a correct sensor can be performed.

When the decrypted message is transmitted in step S15, in the vehicle control unit 22, in step S45, the communication unit 145 receives the decrypted message transmitted from the control unit 81 of the image sensor 52, and supplies the received decrypted message to the control unit 144 via the bus 146.

In step S46, the authentication processing unit 162 compares the authentication message generated in step S42 with the decrypted message received in step S45.

By the processing in steps S42 to S46 and the processing in steps S13 to S15, the authentication processing by a secret key encryption method (common key encryption method) for performing authentication using secret keys stored in both sides, such as a cipher block chaining (CBC) mode of an advanced encryption standard (AES), a data encryption standard (DES) method, or the like has been performed. Note that the encryption method in the authentication processing is not limited to the AES method or the DES method and may be any other method as long as the method is a secret key encryption method.

In step S47, the authentication processing unit 162 determines whether or not the image sensor 52 connected to the vehicle control unit 22 has been authenticated as a correct sensor on the basis of the comparison result in step S46.

For example, in a case where the decrypted message matches the authentication message generated in step S42, it is determined that the image sensor 52 has been authenticated as a correct sensor.

In the case where it is determined in step S47 that the image sensor 52 has been authenticated, the connection sensor authentication processing ends, and thereafter, the control regarding driving of the vehicle 11 is performed on the basis of the captured image output from the image sensor 52. That is, image acquisition processing to be described below is performed.

On the other hand, in a case where it is determined in step S47 that the image sensor 52 has not been authenticated as a correct sensor, the control unit 144 reactivates the image sensor 52, and the connection sensor authentication processing ends.

That is, the control unit 144 generates control information giving an instruction on reactivation of the image sensor 52, that is, the camera 21, and transmits the control information to the image sensor 52 by the communication unit 145. The control unit 81 of the image sensor 52 receives the control information giving an instruction on the reactivation transmitted from the communication unit 145, via the input/output unit 53 and the input/output unit 54, and performs reactivation according to the received control information.

In the case where the image sensor 52 receives the control information giving an instruction on reactivation from the vehicle control unit 22 after step S15 in the response processing, the image sensor 52 performs reactivation according to the control information and newly performs the response processing. Furthermore, the vehicle control unit 22 also newly performs the connection sensor authentication processing in response to the reactivation of the image sensor 52.

At this time, when an authentication result indicating that the image sensor 52 is a correct sensor cannot be obtained even if the reactivation is performed by a predetermined number of times, the control unit 144 may output a notification or the like notifying that an unauthorized image sensor is connected to the outside so as to stop subsequent processing.

As described above, the image sensor 52 and the vehicle control unit 22 perform authentication by exchanging the authentication messages using the secret key KYC and the secret key KYA common to each other. By doing so, it is possible to prevent replacement with an unauthorized image sensor and to ensure safety. In particular, occurrence of an accident can be prevented from the start of the vehicle 11 by performing the authentication processing at the time of activation of the camera 21 (image sensor 52).

<Description of Image Output Processing>

When the connection sensor authentication processing and the response processing described above are performed and the image sensor 52 is authenticated, thereafter, image output processing in which the image sensor 52 performs capture and outputs a captured image, and image acquisition processing in which the vehicle control unit 22 acquires the captured image output from the image sensor 52 and performs control regarding driving are performed.

First, the image output processing performed by the image sensor 52 will be described with reference to the flowchart in FIG. 8.

In step S81, the control unit 81 receives initial setting information transmitted from the vehicle control unit 22 via the input/output unit 53 and the input/output unit 54.

Here, the initial setting information is information indicating initial settings of when capturing a captured image. Specifically, for example, the initial setting information is information and the like regarding a captured image such as a frame rate of the captured image and the size of the captured image at the time of start of capture.

In step S82, the control unit 81 performs initial settings at the time of capturing the captured image on the basis of the initial setting information received in step S81. That is, the control unit 81 determines the size, the frame rate, and the like of the captured image on the basis of the initial setting information.

In step S83, the control unit 81 activates each unit of the image sensor 52. Then, in step S84, the pixel array unit 82 captures the captured image.

That is, the control unit 81 controls the operation of the pixel array unit 82 according to the initial settings, and the pixel array unit 82 performs capture according to the control of the control unit 81 and supplies a resultant captured image, that is, image data of the captured image to the signal processing unit 83.

At the time of capture, the pixel array unit 82 receives the light incident from the object via the lens 51 and photoelectrically converts the light to obtain the captured image. Furthermore, the signal processing unit 83 applies the processing such as gain adjustment and white balance adjustment to the captured image supplied from the pixel array unit 82 according to the control of the control unit 81, and supplies the captured image to the encryption processing unit 84 and the image output unit 85.

In step S85, the control unit 81 determines whether or not to change (update) the encryption region of the captured image. For example, in a case where the vehicle control unit 22 changes the encryption region, the encryption region designation information indicating the encryption region after change is transmitted from the communication unit 145 of the vehicle control unit 22 to the control unit 81 at appropriate timing. Therefore, in the case where the encryption region designation information is transmitted from the communication unit 145, the control unit 81 determines to change the encryption region in step S85.

In a case where the control unit 81 determines not to change the encryption region in step S85, processing in steps S86 to S88 is not performed, and the processing thereafter proceeds to step S89.

In contrast, in the case where the control unit 81 determines to change the encryption region in step S85, the control unit 81 receives the encryption region designation information transmitted from the communication unit 145 via the input/output unit 53 and the input/output unit 54 in step S86. That is, the control unit 81 acquires the encryption region designation information from the vehicle control unit 22. Here, the encryption region designation information transmitted from the vehicle control unit 22 is information encrypted with the secret key KYA.

In step S87, the decryption unit 102 decrypts the encryption region designation information received in step S86 using the secret key KYC stored in the storage unit 101.

Furthermore, the control unit 81 supplies the encryption region designation information after decryption to the encryption processing unit 84 and gives an instruction on change of the encryption region. Moreover, the control unit 81 supplies the secret key KYC stored in the storage unit 101 together with the encryption region designation information to the encryption processing unit 84.

In step S88, the encryption processing unit 84 changes (updates) the encryption region on the basis of the encryption region designation information supplied from the control unit 81, and the processing proceeds to step S89. That is, the encryption processing unit 84 changes the encryption region to be encrypted on the captured image to the region indicated by the newly supplied encryption region designation information. Note that the number of encryption regions indicated by the encryption region designation information may be one or plural.

When the processing in step S88 has been performed or it is determined not to change the encryption region in step S85, processing in step S89 is performed.

That is, in step S89, the encryption processing unit 84 encrypts the image of a portion of the encryption region in the captured image supplied from the signal processing unit 83, using the secret key KYC supplied from the control unit 81 and supplies a resultant encrypted image to the image output unit 85.

Thereby, a portion of the encryption region indicated by the encryption region designation information in the image data of the captured image that is output data output from the image sensor 52 to the vehicle control unit 22, that is, the image data of the captured image that is the target to be ensured for safety (the target to be detected for falsification) is encrypted, and the encrypted image is generated.

In step S90, the image output unit 85 embeds the encrypted image supplied from the encryption processing unit 84 in the captured image supplied from the signal processing unit 83.

Figure 9:
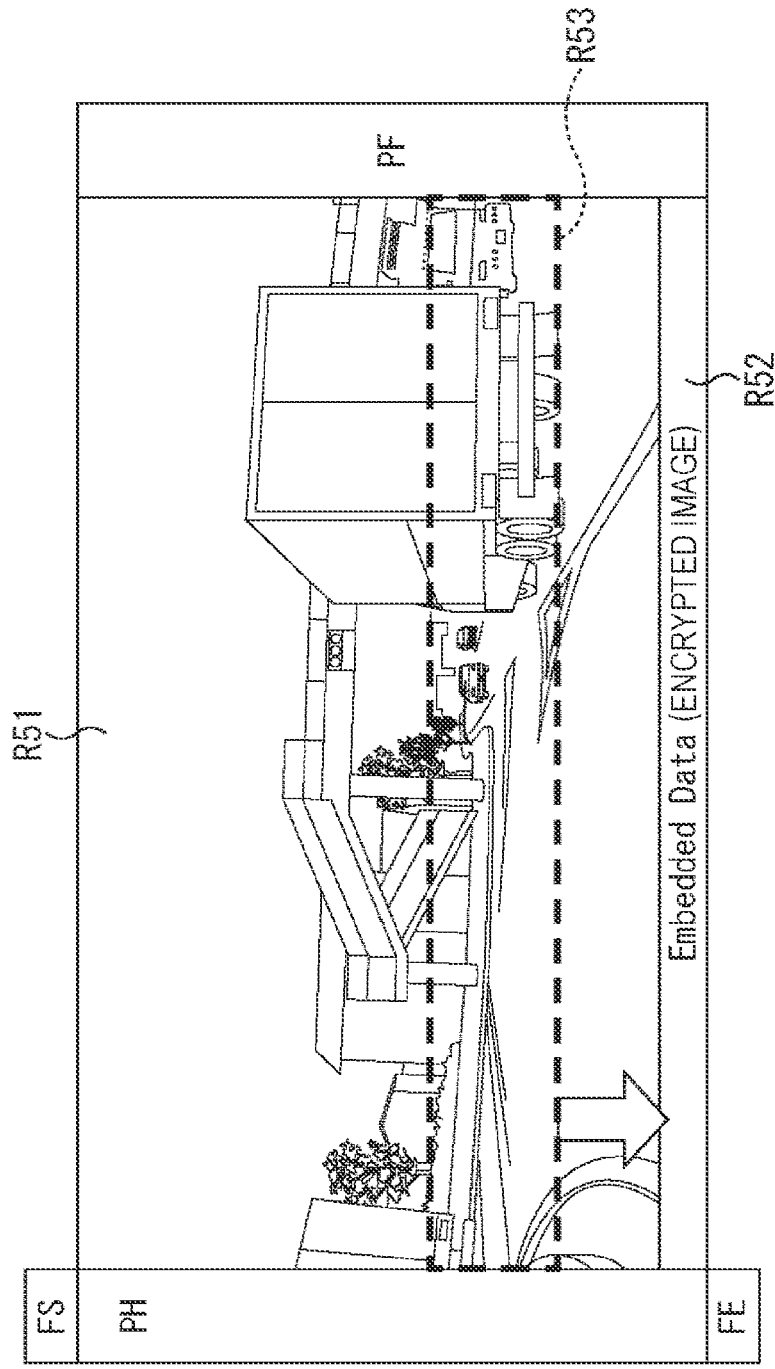
FIG. 9 is a diagram for describing embedding of an encrypted image.

For example, assume that the captured image is output in the format illustrated in FIG. 9 from the image output unit 85 for each frame. In the example illustrated in FIG. 9, data from frame start (FS) to frame end (FE) is data for one frame of the captured image that is a moving image, and the data is stored in a packet and output.

That is, in this example, a region R51 for storing the image data for one frame of the captured image and a region R52 of Embedded Data are provided between packet header (PH) and packet footer (PF).

Here, the region R51 is a region for storing the image data for one frame of the captured image obtained by capture, and the region R52 following the region R51 is a region for storing the image data of the encrypted image. That is, the region R52 is a region where the encrypted image is embedded. In particular, in this example, the region R52, which is a free region that can store arbitrary data different from the image data of the captured image, is used as a region in which the encrypted image is embedded.

Therefore, in this example, the image data for one frame of the captured image is stored and output in several packets to which a packet header and a packet footer are added. Similarly, the encrypted image is also stored and output in a packet to which a packet header and a packet footer are added.

For example, in a case where a region R53 on the captured image is the encryption region of this frame, the encryption processing unit 84 encrypts an image of a portion of the region R53 in the captured image using the secret key KYC to generate the encrypted image. Then, the image output unit 85 embeds the encrypted image obtained by the encryption in the portion of the region R52 of the captured image. That is, the image data of the encrypted image is added after the image data for one frame of the captured image.

By embedding the encrypted image in the last portion of the image data for one frame of the captured image, that is, in the portion of Embedded Data in this manner, the vehicle control unit 22 can acquire the encrypted image for the frame together with the image data for the one frame of the captured image. Therefore, the vehicle control unit 22 can immediately detect the presence or absence of falsification of the captured image.

Note that, here, an example in which one region R53 on the captured image is the encryption region has been described. However, when there is a plurality of encryption regions on the captured image for one frame, images of the respective encryption regions are encrypted, and a plurality of encrypted images respectively corresponding to the plurality of encryption regions is generated.

Figure 8:
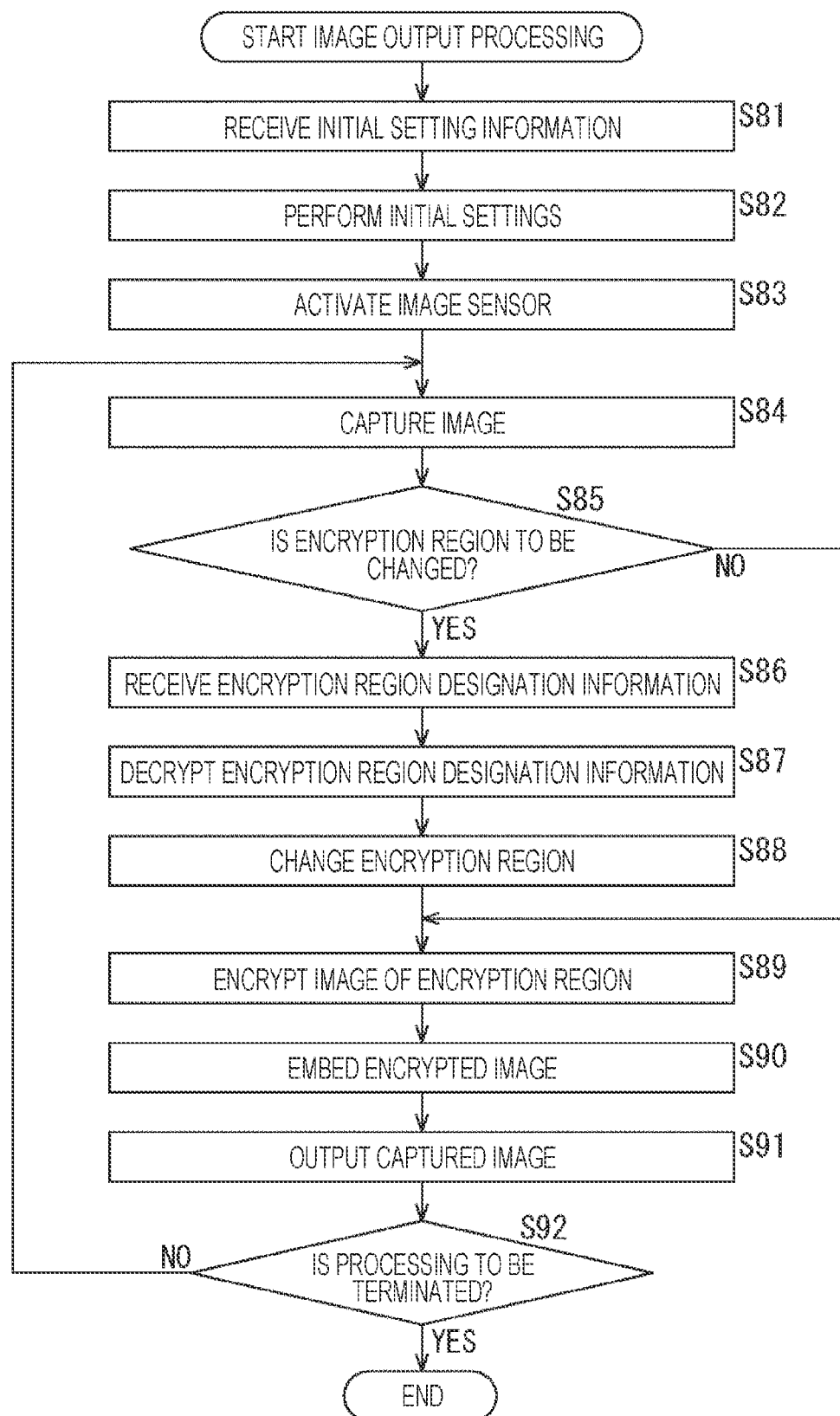
FIG. 8 is a flowchart for describing image output processing.

Referring back to the description of the flowchart in FIG. 8, in step S91, the image output unit 85 outputs the captured image in which the encrypted image is embedded. That is, in step S91, the captured image and the encrypted image are output.

In other words, the image output unit 85 transmits the captured image in which the encrypted image is embedded to the image input unit 141 of the vehicle control unit 22 via the input/output unit 53 and the input/output unit 54.

The processing in steps S84 to S91 is performed for each frame of the captured image.

In step S92, the control unit 81 determines whether or not to terminate the processing of capturing and outputting a captured image. For example, in a case where the vehicle control unit 22 or the like gives an instruction on termination of capture of a captured image, it is determined that the processing is to be terminated.

In a case where it is determined in step S92 that the processing is not yet terminated, the processing returns to step S84 and the above-described processing is repeatedly performed.

On the other hand, in a case where it is determined in step S92 that the processing is to be terminated, the image output processing is terminated.

As described above, the image sensor 52 captures the captured image, encrypts the image of the encryption region of the captured image to generate the encrypted image, and outputs the captured image and the encrypted image. By encrypting a partial region called encryption region of the captured image to generate the encrypted image in this manner, the processing load in the image sensor 52 and the vehicle control unit 22 can be reduced while ensuring the safety.

In particular, the image sensor 52 encrypts the image of the encryption region designated by the encryption region designation information that changes with time, for each frame, whereby sufficient safety can be ensured even in the case of encrypting only a part of the captured image.

<Description of Image Acquisition Processing>

Figure 10:
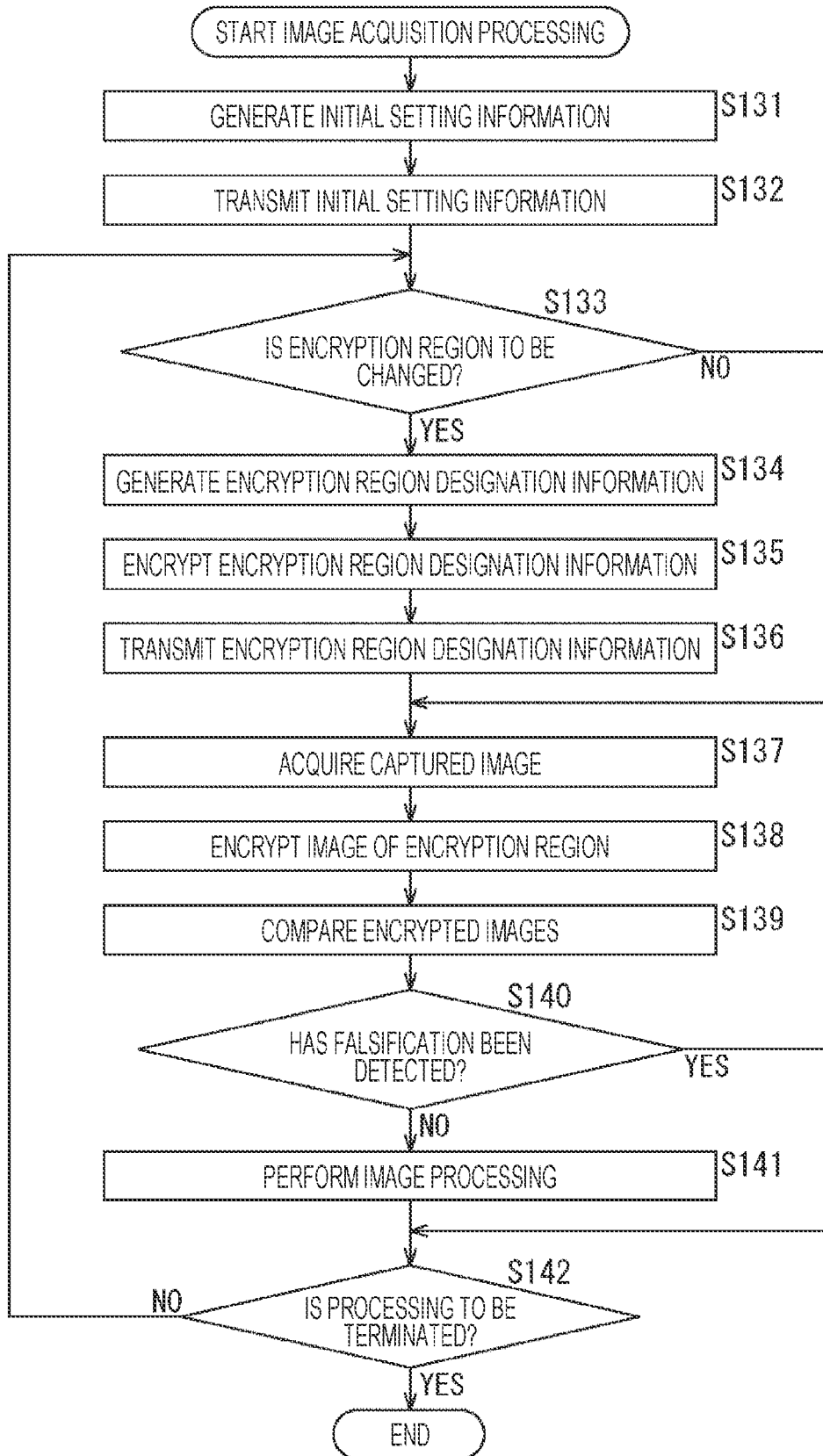
FIG. 10 is a flowchart for describing image acquisition processing.

Next, the image acquisition processing performed by the vehicle control unit 22 when the image output processing described with reference to FIG. 8 is performed by the image sensor 52 will be described. That is, hereinafter, the image acquisition processing by the vehicle control unit 22 will be described with reference to the flowchart in FIG. 10.

In step S131, the setting unit 163 generates the initial setting information, and supplies the generated initial setting information to the communication unit 145 via the bus 146. Note that the initial setting information may be encrypted or not particularly encrypted.

In step S132, the communication unit 145 transmits the initial setting information supplied from the setting unit 163 to the control unit 81 of the image sensor 52 via the input/output unit 54 and the input/output unit 53. The initial setting information transmitted in this way is received by the control unit 81 in step S81 of the image output processing described with reference to FIG. 8.

Furthermore, not only the initial settings of capture but also settings of capture can be changed by performing similar processing to steps S131 and S132 in a case of changing settings regarding capture of the captured image during capture, for example, settings of white balance, brightness, or the like.

In this case, the setting unit 163 generates setting information indicating settings regarding capture after change, and the communication unit 145 transmits the setting information. Then, in the image sensor 52, the control unit 81 receives the setting information, and controls the pixel array unit 82 and the signal processing unit 83 according to the received setting information to cause these units to operate according to the settings.

In step S133, the control unit 144 determines whether or not to change the encryption region.

For example, in a case where the encryption region is changed (updated) for each frame of the captured image, change of the encryption region is determined at timing when processing for one frame ends.

Note that the encryption region may be changed for every plurality of frames, in addition to being changed for each frame of the captured image. Furthermore, the encryption region may be changed at fixed intervals or may be changed with an indefinite period, that is, at random timing.

In a case where it is determined not to change the encryption region in step S133, processing in steps S134 to S136 is not performed, and the processing thereafter proceeds to step S137.

On the other hand, in the case where it is determined to change the encryption region in step S133, the control unit 144 generates the encryption region designation information indicating a new encryption region after change in step S134.

For example, the control unit 144 determines the encryption region at each frame (time) such that the position and size of the encryption region, and the number of encryption regions are randomly changed for each frame, and generates the encryption region designation information indicating the determined encryption region.

By changing the encryption region for each frame, that is, with time, in this manner, the encryption region is made smaller than the entire region of one frame of the captured image to reduce the processing load, and the encryption region is made less easily specified, whereby sufficient safety can be ensured.

In particular, by determining the size and the number of the encryption regions according to the processing capacity of the vehicle control unit 22, that is, the control unit 144, the control unit 144 can ensure the maximum safety in a processable range in real time.

Furthermore, for example, in a case where an important object for safety is present on the captured image, a region including the object may be set as the encryption region.

Specifically, assume that the image processing unit 165 of the control unit 144 detects another vehicle traveling in front of the vehicle 11 from the captured image, and controls a traveling speed and the like of the vehicle 11 so as not to collide with the another vehicle on the basis of the detection result.

In this case, by setting a region including the another vehicle in the captured image, more specifically, a region where the another vehicle would be included, as the encryption region, falsification of the region including at least the another vehicle as the object in the captured image can be necessarily sensed. Therefore, the vehicle control unit 22 can correctly control the traveling speed and the like so as not to collide with the another vehicle, and sufficient safety can be ensured even with a small processing load.

For example, to completely ensure the safety of the captured image for one frame, the entire captured image needs to be set as the encryption region. However, by setting a region of a necessary object and the like such as the region where another vehicle is captured as the object, as in the above-described example, as the encryption region, the safety of at least a necessary region on the captured image can be completely ensured even if the encryption region is a region for several lines of the captured image.

In step S135, the encryption processing unit 164 encrypts the encryption region designation information generated in step S134, using the secret key KYA stored in the storage unit 161, and supplies the encrypted encryption region designation information to the communication unit 145 via the bus 146.

By encrypting the encryption region designation information in this manner, leakage of the encryption region can be prevented and the safety can be improved. That is, the secure level can be maintained.

Note that, here, an example of encrypting the encryption region designation information for designating the encryption region, using the secret key KYA, as a parameter used for encrypting the image of the encryption region of the captured image, has been described. However, when there is a parameter transmitted from the vehicle control unit 22 to the image sensor 52 in order to encrypt the image of the encryption region of the captured image, in addition to the encryption region designation information, the parameter is also encrypted using the secret key KYA.

In step S136, the communication unit 145 transmits the encrypted encryption region designation information, which has been supplied from the encryption processing unit 164 of the control unit 144, to the control unit 81 of the image sensor 52 via the input/output unit 54 and the input/output unit 53.

Therefore, in step S86 of the image output processing described with reference to FIG. 8, the encryption region designation information transmitted in the processing in step S136 is received.

In a case where the processing in step S136 has been performed or it is determined not to change the encryption region in step S133, processing in step S137 is performed.

That is, in step S137, the image input unit 141 acquires, via the input/output unit 54 and the input/output unit 53, the captured image in which the encrypted image is embedded, which has been output from the image output unit 85 of the image sensor 52. In other words, the image input unit 141 receives the captured image transmitted by the image output unit 85. Thereby, the captured image as acquired data acquired from the image sensor 52 and the encrypted image embedded in the captured image are acquired.

Here, the captured image output in step S91 in the image output processing described with reference to FIG. 8 is acquired in step S137.

The image input unit 141 appropriately supplies the received captured image to the memory 142 and stores the captured image in the memory 142, or supplies the captured image to the control unit 144. Here, to simplify the description, it is assume that the received captured image is supplied from the image input unit 141 to the control unit 144 via the bus 146.

In step S138, the encryption processing unit 164 encrypts the image of the encryption region indicated by the encryption region designation information generated in step S134, in the captured image supplied from the image input unit 141, using the secret key KYA stored in the storage unit 161. Thereby, the encrypted image encrypted using the secret key KYA is obtained.

In step S139, the control unit 144 compares the encrypted image embedded in the captured image acquired in step S137 with the encrypted image generated in the processing in step S138. These encrypted images are images obtained by encrypting the image of the same region on the captured image using the same secret key. Therefore, if the captured image has not been falsified from when output from the image output unit 85 to when received in the image input unit 141, these two encrypted images should match.

In step S140, the control unit 144 determines whether or not falsification of the captured image has been detected on the basis of a result of the comparison in step S139.

For example, in a case where the two encrypted images do not match, that is, the encrypted image embedded in the captured image and the encrypted image generated in step S138 are not the same in the processing in step S139, it is determined that falsification of the captured image has been detected.

In a case where it is determined in step S140 that falsification has been detected, processing in step S141 is not performed and processing thereafter proceeds to step S142. In this case, for example, the control unit 144 outputs a notification indicating that the falsification of the captured image has been detected (sensed) or the like to the outside, and appropriately performs processing of stopping automatic driving of the vehicle 11 and the like.

On the other hand, in a case where it is determined in step S140 that falsification has not been detected, the image processing unit 165 performs predetermined image processing on the basis of the captured image supplied from the image input unit 141 in step S141.

For example, the image processing unit 165 performs, as the image processing, an image analysis and the like for the captured image to detect a vehicle in front, a pedestrian, and the like from the captured image, generates driving control information for controlling driving of the vehicle 11 according to the detection result, and outputs the driving control information to the engine, the brake device, and the like.

The processing in steps S133 to S141 is performed for each frame of the captured image. By performing the processing in steps S133 to S141 for each frame of the captured image, the safety can be ensured for all the frames of the captured image. When the processing in step S141 is performed, the processing thereafter proceeds to step S142.

In a case where the processing in step S141 has been performed or it is determined in step S140 that falsification has been detected, the control unit 144 determines whether or not to terminate the processing of acquiring the captured image and controlling regarding driving in step S142.

For example, termination of the processing is determined in the case where it is determined in step S140 that falsification has been detected, in the case where termination of the processing has been given in instruction from the outside, such as terminating capture of the captured image when the vehicle 11 stops, or the like.

In a case where it is determined in step S142 that the processing is not yet terminated, the processing returns to step S133 and the above-described processing is repeatedly performed.

On the other hand, in a case where it is determined in step S142 that the processing is to be terminated, the image acquisition processing is terminated. In this case, for example, the control unit 144 notifies the image sensor 52 of termination of the processing via the communication unit 145.

As described above, the vehicle control unit 22 acquires the captured image from the image sensor 52, and compares the encrypted image generated from the acquired captured image with the encrypted image embedded in the captured image and detects falsification of the captured image.

Thereby, falsification of the captured image can be prevented and the safety can be ensured. At this time, by encrypting a partial region of the captured image as the encryption region to generate the encrypted image, the processing load in the image sensor 52 and the vehicle control unit 22 can be reduced while ensuring the safety.

In particular, by changing the position, size, and the like, of the encryption region with time, the processing load in the image sensor 52 and the vehicle control unit 22 can be reduced while ensuring sufficient safety. Originally, the vehicle control unit 22 performs image processing with a high processing load such as step S141, and the image sensor 52 is also required to have low power consumption. Therefore, it is highly significant to reduce the load of the processing for ensuring safety of the captured image in the image sensor 52 and the vehicle control unit 22.

Note that the above-described example is made on the assumption that the secret key KYC and the secret key KYA are written in a secured state in the storage unit 101 and the storage unit 161. However, there are some cases where these secret keys cannot be stored in a secured state.

However, in such a case, it is possible to ensure sufficient safety by dynamically updating the secret keys although the secure level is somewhat lowered.

Specifically, for example, the communication unit 145 of the vehicle control unit 22 is only required to transmit the secret key KYC to the control unit 81 of the image sensor 52 via the input/output unit 54 and the input/output unit 53 at appropriate timing. The control unit 81 can perform the above-described processing using the secret key KYC by supplying the secret key KYC received from the communication unit 145 to the storage unit 101 and storing the secret key KYC in the storage unit 101.

As described above, when the secret key KYC is transmitted from the vehicle control unit 22 to the image sensor 52, the secret key KYC is updated for each frame of the captured image, and is transmitted from the vehicle control unit 22 to the image sensor 52 in each frame, as appropriate, whereby the safety can be further improved, for example.

<Configuration Example of Computer>

By the way, the above-described series of processing can be executed by hardware or software. In the case of executing the series of processing by software, a program that configures the software is installed in a computer. Here, examples of the computer include a computer incorporated in dedicated hardware, and a general-purpose personal computer or the like capable of executing various functions by installing various programs, for example.

Figure 11:
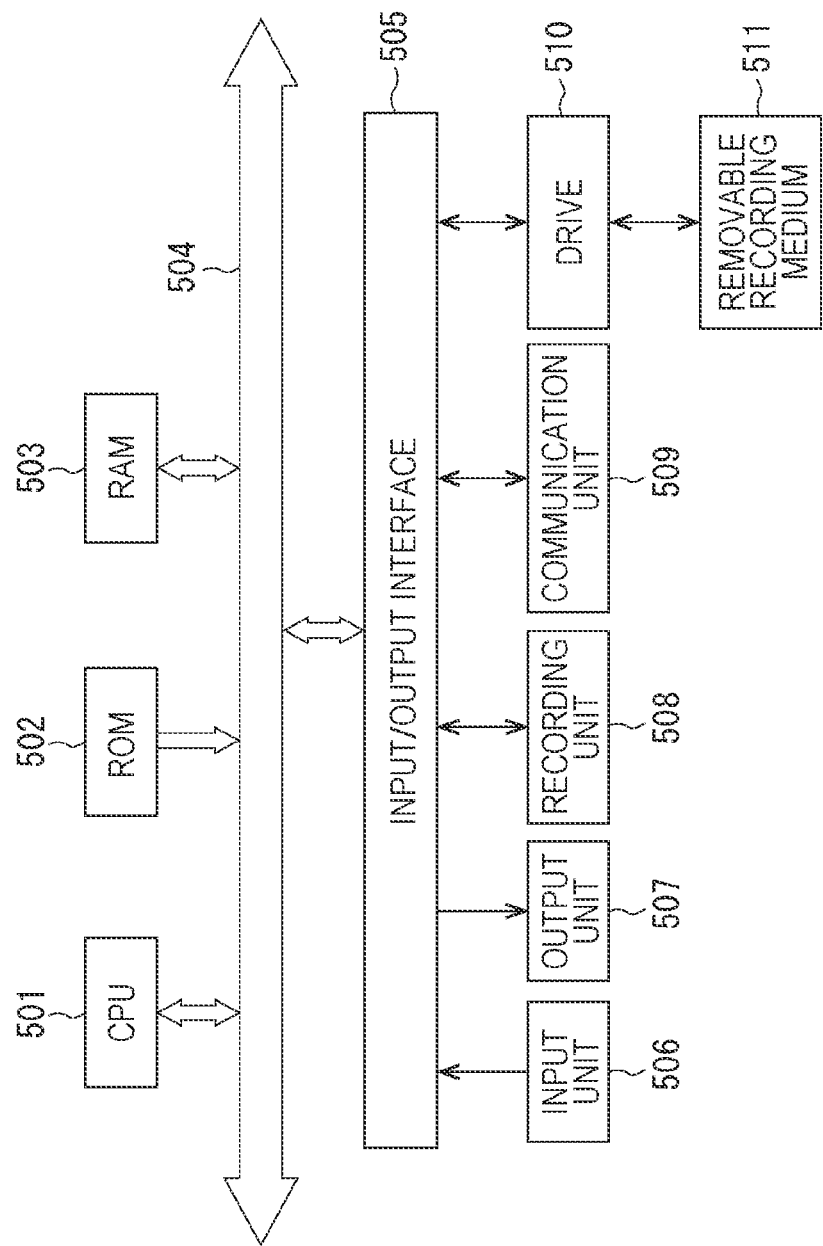
FIG. 11 is a diagram illustrating a configuration example of a computer.

FIG. 11 is a block diagram illustrating a configuration example of hardware of a computer that executes the above-described series of processing by a program.

In a computer, a central processing unit (CPU) 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads a program recorded in the recording unit 508 into the RAM 503 and executes the program via the input/output interface 505 and the bus 504, whereby the above-described series of processing is performed, for example.

The program to be executed by the computer (CPU 501) can be recorded on the removable recording medium 511 as a package medium, for example, and can be provided. Furthermore, the program can be provided via a wired or wireless transmission medium such as a local area network, the Internet, or digital satellite broadcast.

In the computer, the program can be installed to the recording unit 508 via the input/output interface 505 by attaching the removable recording medium 511 to the drive 510. Furthermore, the program can be received by the communication unit 509 via a wired or wireless transmission medium and installed in the recording unit 508. Other than the above method, the program can be installed in the ROM 502 or the recording unit 508 in advance.

Note that the program executed by the computer may be a program processed in chronological order according to the order described in the present specification or may be a program executed in parallel or at necessary timing such as when a call is made.

Furthermore, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Further, the steps described in the above-described flowcharts can be executed by one device or can be executed by a plurality of devices in a shared manner.

Furthermore, in the case where a plurality of processes is included in one step, the plurality of processes included in the one step can be executed by one device or can be shared and executed by a plurality of devices.

Furthermore, the present technology may be configured as follows.

(1)

A signal processing device including:
- a control unit configured to acquire designation information indicating a designated portion to be encrypted in output data; and
- an encryption processing unit configured to encrypt the designated portion indicated by the designation information in the output data using a key, in which
- the designated portion indicated by the designation information changes with time.

(2)

The signal processing device according to (1), further including: an output unit configured to output encrypted data obtained by the encryption and the output data.

(3)

The signal processing device according to (2), in which
- the control unit performs authentication processing using the key with an output destination of the encrypted data and the output data.

(4)

The signal processing device according to (3), in which
- the control unit performs the authentication processing at time of activation of the signal processing device.

(5)

The signal processing device according to any one of (1) to (4), in which
- the control unit acquires the encrypted designation information, and decrypts the encrypted designation information using the key.

(6)

The signal processing device according to any one of (1) to (5), in which
the encryption processing unit encrypts a plurality of the designated portions indicated by the designation information in the output data.

(7)

The signal processing device according to any one of (1) to (6), in which the output data is image data.

(8)

A signal processing method including steps of:
acquiring designation information indicating a designated portion to be encrypted in output data; and
encrypting the designated portion indicated by the designation information in the output data using a key, in which
the designated portion indicated by the designation information changes with time.

(9)

A program for causing a computer to execute processing including steps of: acquiring designation information indicating a designated portion to be encrypted in output data; and
encrypting the designated portion indicated by the designation information in the output data using a key, in which
the designated portion indicated by the designation information changes with time.

(10)

A signal processing device including:
a control unit configured to generate designation information indicating a designated portion to be encrypted in acquired data while changing the designated portion with time;
a communication unit configured to transmit the designation information; and
an acquisition unit configured to acquire encrypted data obtained by encrypting the designated portion indicated by the designation information in the acquired data and the acquired data.

(11)

The signal processing device according to (10), further including:
an encryption processing unit configured to encrypt the designated portion in the acquired data using a key, in which
the control unit compares the encrypted data acquired by the acquisition unit with encrypted data obtained by encryption by the encryption processing unit.

(12)

The signal processing device according to (11), in which
the encryption processing unit encrypts the designation information using the key, and
the communication unit transmits the designation information encrypted by the encryption processing unit.

(13)

The signal processing device according to (11) or (12), further including:
an authentication processing unit configured to perform authentication processing using the key with an acquisition source of the acquired data and the encrypted data.

(14)

The signal processing device according to (13), in which
the authentication processing unit performs the authentication processing at time of activation of the acquisition source.

(15)

The signal processing device according to any one of (10) to (14), in which
the control unit generates the designation information indicating a plurality of the designated portions.

(16)

The signal processing device according to any one of (10) to (15), in which the acquired data is image data.

(17)

A signal processing method including steps of:
generating designation information indicating a designated portion to be encrypted in acquired data while changing the designated portion with time;
transmitting the designation information; and
acquiring encrypted data obtained by encrypting the designated portion indicated by the designation information in the acquired data and the acquired data.

(18)

A program for causing a computer to execute processing including steps of:
generating designation information indicating a designated portion to be encrypted in acquired data while changing the designated portion with time;
transmitting the designation information; and
acquiring encrypted data obtained by encrypting the designated portion indicated by the designation information in the acquired data and the acquired data.

REFERENCE SIGNS LIST

11 Vehicle
21-1 to 21-4 and 21 Camera
22 Vehicle control unit
52 Image sensor
81 Control unit
82 Pixel array unit
84 Encryption processing unit
85 Image output unit
101 Storage unit
102 Decryption unit
141 Image input unit
144 Control unit
145 Communication unit
161 Storage unit
162 Authentication processing unit
163 Setting unit
164 Encryption processing unit
165 Image processing unit

The invention claimed is:

1. An imaging device for a vehicle, the imaging device comprising:
a pixel array configured to generate image data representing an image; and
control circuitry configured to:
store a key in a storage unit;
receive designation information from a vehicle control device, wherein the designation information indicates a partial region of the image; and
generate first encrypted data based on encryption of a first part of the image data corresponding to the partial region of the image, wherein
the encryption is associated with the key, and
the partial region changes with time.

2. The imaging device according to claim 1, further comprising an output unit configured to output the first encrypted data and the image data to the vehicle control device.

3. The imaging device according to claim 1, wherein
the designation information is encrypted designation information; and
the control circuitry is further configured to decrypt the encrypted designation information based on the key.

4. The imaging device according to claim 1, wherein
the designation information further indicates a plurality of partial regions of the image, and
the control circuitry is further configured to generate second encrypted data based on encryption of a second part of the image data corresponding to the plurality of partial regions of the image.

5. The imaging device according to claim 1, wherein the partial region changes for each plurality of frames of the image.

6. The imaging device according to claim 1, wherein the partial region changes for each frame of the image.

7. The imaging device according to claim 1, wherein the partial region changes at a specific time interval.

8. The imaging device according to claim 1, wherein the partial region changes at random timing.

9. The imaging device according to claim 1, wherein the first encrypted data corresponds to a data for authentication processing between the imaging device and a vehicle control circuitry of the vehicle control device.

10. A vehicle control device, comprising:
control circuitry configured to:
generate designation information indicating a partial region of an image data associated with an imaging device; and
receive encrypted data with image data representing the image, wherein
the encrypted data is associated with encryption of a part of the image data corresponding to the partial region of the image, and
the partial region changes with time.

11. The vehicle control device according to claim 10, further comprising:
an output unit configured to output the designation information to the imaging device.

12. The vehicle control device according to claim 11, wherein
the control circuitry is further configured to:
store a key; and
encrypt the designation information based on the key, and
the output unit is further configured to output the encrypted designation information to the imaging device.

13. The vehicle control device according to claim 10, wherein the control circuitry is further configured to perform authentication processing, based on the encrypted data, between the imaging device and the vehicle control device.

14. The vehicle control device according to claim 10, wherein the control circuitry is further configured to decrypt the received encrypted data.

15. The vehicle control device according to claim 10, wherein the partial region changes for at least one of
each plurality of frames of the image,
each frame of the image,
specific time intervals, or
a random timing.

16. An imaging system for a vehicle, the imaging system comprising:
a vehicle control device; and
an imaging device configured to generate image data representing an image, wherein
the imaging device includes a first control circuitry configured to:
store a first key;
receive designation information, indicating a partial region of the image, from the vehicle control device;
generate first encrypted data based on encryption of a first part of the image data corresponding to the partial region of the image, wherein the encryption of the part of the image data is associated with the first key; and
output the image data and the first encrypted data to the vehicle control device, and
the vehicle control device includes a second control circuitry configured to:
generate the designation information;
output the designation information to the imaging device; and
receive the image data and the first encrypted data from the imaging device, wherein the partial region changes with time.

17. The imaging system according to claim 16, wherein the second control circuitry is further configured to perform authentication processing, based on the first encrypted data, between the imaging device and the vehicle control device.

18. The imaging system according to claim 16, wherein the second control circuitry is configured to:
store a second key; and
encrypt the designation information based on the second key.

19. The imaging system according to claim 16, wherein
the designation information indicates a plurality of partial regions of the image, and
the first control circuitry is further configured to generate second encrypted data based on encryption of a second part of the image data corresponding to the plurality of partial regions of the image.

20. The imaging system according to claim 16, wherein the partial region changes for at least one of
each plurality of frames of the image,
each frame of the image,
specific time intervals, or
a random timing.

* * * * *